C. B. CLARK.
PLOW.
APPLICATION FILED JAN. 11, 1908.

909,848.

Patented Jan. 12, 1909.
6 SHEETS—SHEET 1.

UNITED STATES PATENT OFFICE.

CYRIL B. CLARK, OF NEW ALBANY, INDIANA, ASSIGNOR TO B. F. AVERY & SONS, A CORPORATION OF KENTUCKY.

PLOW.

No. 909,848.      Specification of Letters Patent.      Patented Jan. 12, 1909.

Application filed January 11, 1908. Serial No. 410,390.

*To all whom it may concern:*

Be it known that I, CYRIL B. CLARK, a citizen of the United States, residing at New Albany, in the county of Floyd and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and particularly to wheel plows.

The invention comprises the provision of a wheel plow having a frame and wheels for supporting the same, and a plow designed to be reversed without reversing the frame.

The invention further comprises the provision of a wheel plow arranged with means for reversing the plow without reversing the frame, and means for varying the cut of the plow.

The invention still further comprises the provision of a wheel plow having a frame and supporting wheels arranged to support the plow and operating mechanism therefor, various means for raising and lowering the plow, means for reversing the plow, and means for varying the angle of draft upon the plow.

The object in view is the provision of a plow which may be reversed without reversing the frame carrying the same, and the provision of a plow that may have the cut adjusted for varying widths.

Another object in view is the provision of improved raising and lowering means for a wheel plow, means for rigidly holding the plow at a proper angle and yet have free easy rotation thereof, and means for regulating the angle of the carrying or supporting wheels in relation to the angle of the plow.

With these and other objects in view the invention comprises certain novel constructions, combinations, and arrangements of parts as will be hereinafter more fully described and claimed.

In the accompanying drawings.

In constructing a plow according to the present invention a framework is provided having a supporting bar 1 designed to have its ends supported by supporting wheels 2 and 3 and a second bar, 4, substantially semi-circular sustained by supporting wheel 5. By this construction a framework is provided that is supported and evenly balanced upon three wheels one of which is designed to travel upon the unplowed ground during operation and two of which are designed to travel in the furrow.

Figures 8, 12, 13, 14:
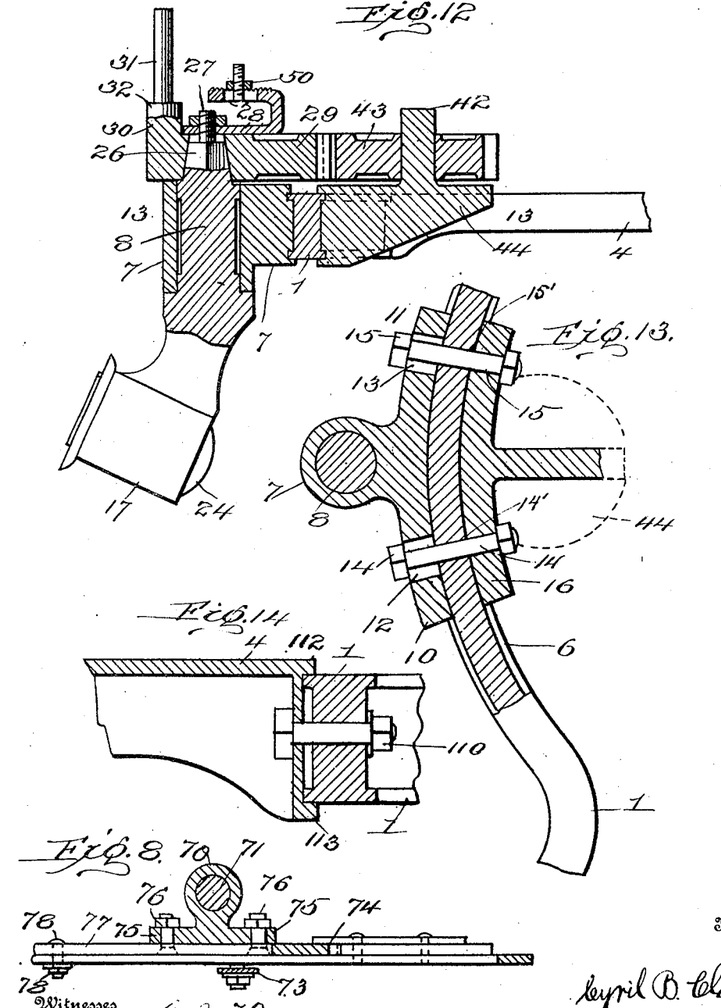
Fig. 8 is a fragmentary section on line 8—8 of Fig. 2.
Fig. 12 is a fragmentary sectional view approximately on line 12—12 of Fig. 3.
Fig. 13 is a fragmentary sectional view on line 13—13 of Fig. 12.
Fig. 14 is an enlarged detail fragmentary sectional view approximately on line 14—14 of Fig. 3.

The beam or part of frame 1 is bent upon the arc of a circle at 6. This bend is preferably positioned opposite the semi-circular member 4 and has secured thereto a bracket 7 that is designed to receive a shaft or journal 8. The shaft or journal 8 is the shaft that through proper connecting means receives the plow as disk 9 and determines the position of the same. The bracket 7 is formed with the ears 10 and 11 which are slotted at 12 and 13 through which bolts 14 and 15 pass. The bolts 14 and 15 are designed to pass entirely through the curved part 6 of member 1 and through a plate or bracket 16, as clearly seen in Fig. 13. The bracket 7 and lugs or extensions 10 and 11 are formed with flanges which extend or lap over the bar 1 and bracket 16 is also formed with flanges for lapping or extending over bar 1, as clearly seen in Fig. 13. By this structure the bar 1 is in a certain sense grasped by brackets 7 and 16, bolts 14 and 15 holding the same in place. By this structure a comparatively large bearing or gripping surface is provided and a structure is produced that will prevent any tendency to twist or turn. The curved portion 6 of bar 1 may be provided with any desired number of apertures 14' and 15' through which bolts 14 and 15 may pass for properly positioning the shaft 8 substantially central of the arc shaped portion 6. The main adjustment, however, of bracket 7 and consequently shaft 8 is by means of the slots 12 and 13 which normally form a sufficient adjustment of bracket 7 to correctly position shaft 8 so that the plow 9 will make the same cut in either position. Ordinarily the slots 12 and 13 are sufficient for the proper adjustment of bracket 7 so that bar 1 will be only provided with one set of holes or apertures.

Positioned in bracket 7 is a journal 8 that has a bearing member 17 formed at an angle to the main shaft. The bearing member 17 is formed with a flaring end 18 for receiving or having placed thereover retaining members 19. The retaining members 19 are preferably formed in a plurality of parts and are secured in place by bolts as 20 and 21 to disk securing member 22. The disk or plow receiving member 22 is formed in the shape of a disk and has one side concave for permitting the disk plow 9 to snugly fit therein and be secured thereto by bolts 22' and has the other side formed with an extension 23. The extension 23 is designed to be machined off until perfectly smooth for forming a bearing member 23 designed to rotate in a cup bearing 24 that is also preferably machined for forming a more perfect bearing surface. The cup shaped bearing member 24 is designed to fit in bearing member 17 and project a short distance therethrough, as clearly seen in Fig. 7, a suitable key or spline 25 being provided for preventing any slipping of the bearing member. Ordinarily in operation the pressure against plow 9 will cause all of the friction to be exerted upon bearing members 23 and 24 and retaining members 19 act simply as means for preventing accidental displacement of the plow.

Figure 2:
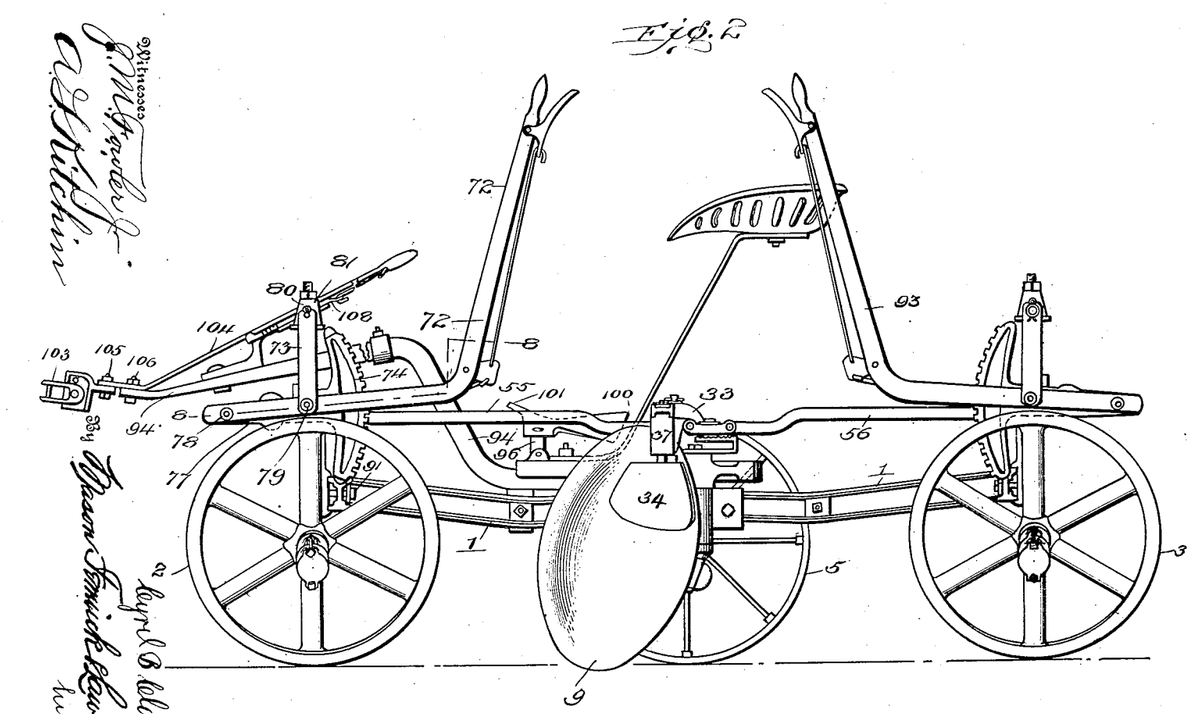
Fig. 2 is a side elevation of the structure shown in Fig. 1, the same being taken from the opposite side to that of Fig. 1.

The shaft 8 is formed at its upper end with a beveled squared portion 26 and a reduced extension therefrom 27 that is designed to be screw threaded for receiving a nut for holding in place an arm 28. The beveled portion 26 is designed to pass through a segmental gear 29 and to receive power therefrom for turning shaft 8 and connected parts. Gear 29 has formed opposite the teeth thereof a lug or extension 30 that is reduced at 31 for forming shoulders 32. The reduced portion 31 is designed to pass upward through an arm 33 that carries a scraper 34 which is used for cleaning plow 9. Arm 33 is formed with an enlarged lug 35 that has provided therein an elongated slot 36 through which the reduced portion 31 extends. By means of lug 35 and shoulders 32, arm 33 is held in a sufficiently elevated position to permit plow 9 to pass thereunder, as seen in Fig. 2. The arm 33 carries at its outer end a bracket 37 which is adjustably secured to arm 33 by means of bolt 38, a slot 39 being formed in arm 33 for permitting the adjustment of bolt 38. Bracket 37 carries a shaft 40 that is held in position by a cotter-pin 41. This shaft is designed to carry a scraper 34 and to permit a free rotation of the same, the cotter-pin 41 limiting the downward movement and the arm 33 limiting the upward movement. By this construction the scraper 34 is adjusted automatically to any angle or contingency arising in regard to the disposition of disk 9 and by its free rotation permit the disk 9 to be moved to cut in either direction. The arm 33 is pivotally mounted at one end upon shaft 42 that passes through and acts as a journal for segmental gear 43. Shaft 42 is also secured in an extension on bracket 44 formed integral with plate 16. By this construction it will be observed that arm 33 simply moves upon the arc of a circle with shaft 42 as a center and the movement of the arm is regulated by the movement of the standard 8. For adjusting manually the position of scraper 34 bolt 38 passing through the outer end of arm 33 is moved together with surrounding parts. By this arrangement the scraper may be caused to impinge against the disk 9 with greater or less force and also the scraper 34 may be adjusted for different size disks or plows.

Figures 7, 9:
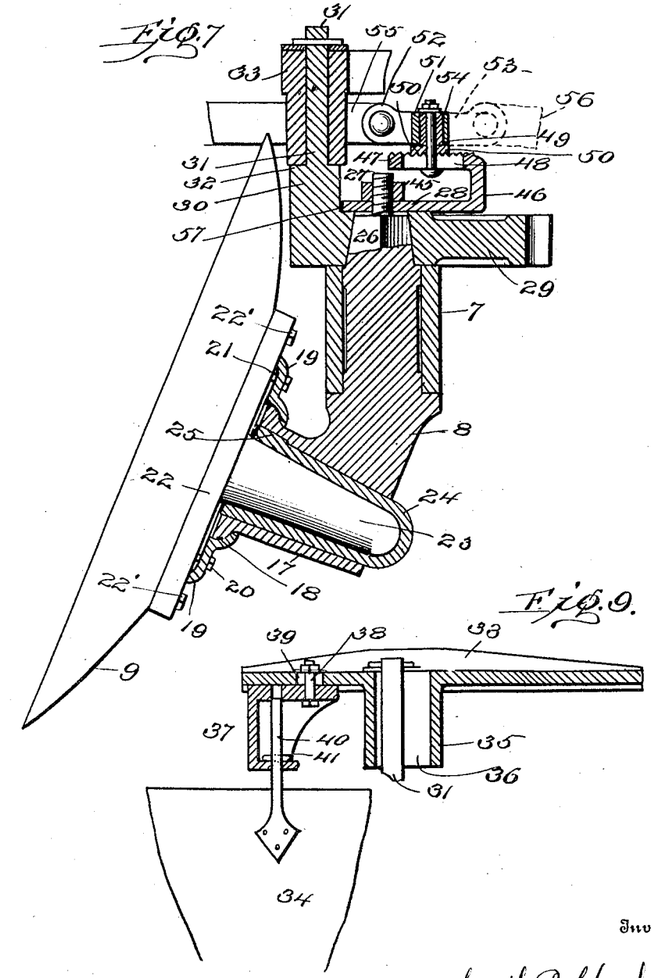
Fig. 7 is a vertical section through the plow carrying standard and associated parts.
Fig. 9 is a detail fragmentary section through part of the cleaner supporting arm.

The arm 28 is designed to have reduced portion 27 of standard 8 passed therethrough as clearly seen in Fig. 7 and to be secured in position by suitable securing means as nut 45. The arm 28 acts as a washer for holding segmental gear 29 in position on squared portion 26, and consequently holds shaft 8 correctly in position in bracket 7. Arm 28 though acting as a washer for accomplishing the purpose has as its main object to provide means for automatically turning the wheels 2 and 3 when the disk 9 is reversed. Arm 28 is bent upward at 46 and back again at 47 to any desired distance, preferably to member 27. The bent over portion 47 is formed with a slot or elongated aperture 48 through which passes a bolt 49. The turned over portion or member 47 is preferably corrugated upon its upper surface for receiving a corrugated washer or clamping member 50 which also permits bolt 49 to pass therethrough. Encircling shaft or bolt 49 is a clamp or bearing 51 provided with ears 52 and 53. Surrounding bolt 49 and positioned within member 51 is a bearing sleeve 54. To the bearing or clamping member 51 are pivotally secured arms or links 55 and 56 which extend to the ends of the frame and are connected by means hereinafter more fully described with wheels 2 and 3 so that when arm 28 is moved by reason of gear 29 being moved and surrounding mechanism wheels 2 and 3 will also be moved in proper relation thereto. The clamping of nut 45 against arm 28 ordinarily would be sufficient to cause the rotation of arm 28 with shaft 8, but to make the action positive arm 28 is cut away at 57 for permitting a partial encircling of member 30 which is formed integral with gear 29.

Figures 4, 5, 6:
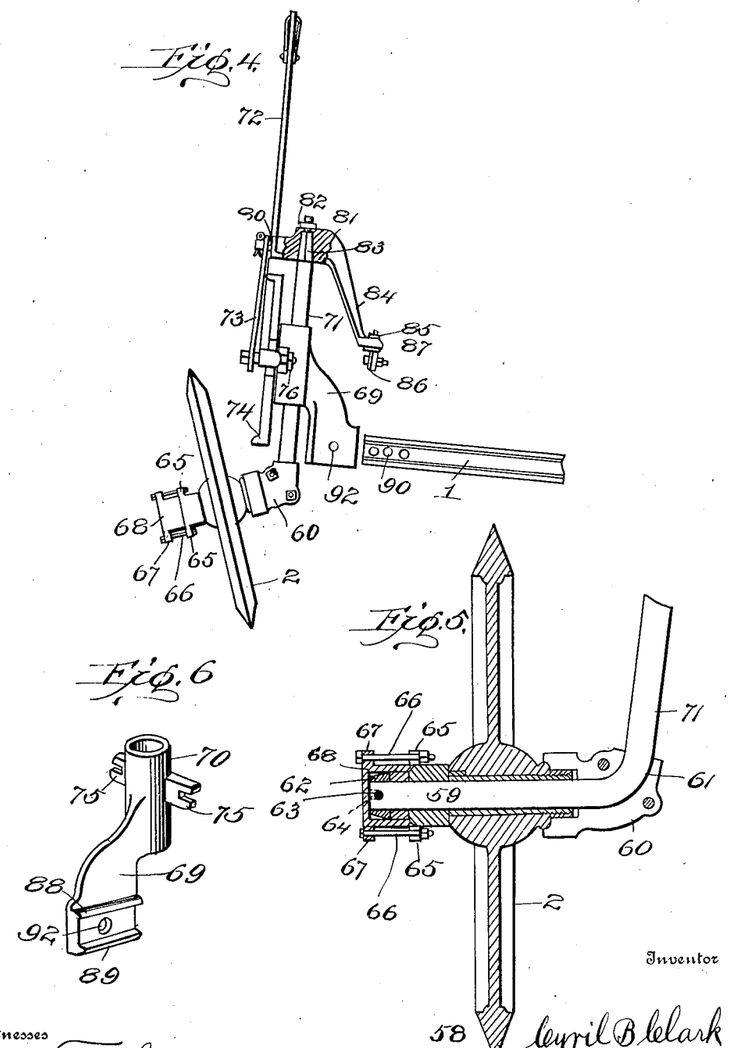
Fig. 4 is a fragmentary end view of one of the supporting wheels and elevating mechanism connected therewith.
Fig. 5 is a vertical section through one of the supporting wheels.
Fig. 6 is a detail perspective view of a bracket used in connection with the elevating means shown in Fig. 4.

Wheel 2 is preferably formed as seen in Fig. 5 with a V shaped rim 58 for engaging the earth for preventing any lateral or skidding movement of the plow. A shaft 59 is designed to pass through wheel 2 and has wheel 2 secured thereto by means of a bracket 60 clamped to the bent portion 61 thereof and a washer or stop 62. The washer or stop 62 is provided with a pin 63 which preferably passes through shaft 59 and fits into apertures or slots 64—64 in washer 62. The hub of wheel 2 has formed thereon lugs 65—65 which are designed to receive bolts 66—66. Bolts 66—66 are designed to pass through lugs 67—67 in a clamping or retaining member 68. By clamping member 68 to the hub of wheel 2 the wheel cannot oscillate to any considerable degree as washer 62 will prevent any outward movement of the wheel and member 68 will prevent any substantial inward movement thereof. In addition to member 68 preventing lateral movement of wheel 2 clamp 60 also will prevent any inward movement of the wheel 2. Shaft 59 after passing through wheel 2 is bent at 61 and extends upward at an angle to the plane of wheel 2, as seen in Fig. 4, and is designed to receive sleeve 70 of bracket 69. Sleeve 70 is designed to reciprocate upon the upright shaft 71 of axle 59 and is moved thereon by the action of lever 72 acting through link 73 and segmental rack 74. Segmental rack 74 is secured to ears 75—75 formed on sleeve 70 by means of bolts 76—76. Segmental rack 74 has an extension 77 to which lever 72 is pivotally mounted at 78 as clearly seen in Figs. 1, 2 and 8. Link 73 is pivotally secured to lever 72 at 79 and pivotally mounted at 80 to a bracket 81, the connection for lever 73 at 80 being loose enough for permitting the desired rotation of member 71 whenever actuated by the parts 81 and 84. By this construction a fulcrum is formed and leverage given to lever 72 for moving upward and downward bracket 69. Bracket 81 is held in position upon a squared portion 83 of shaft 71 so that whenever bracket 81 is moved shaft 71 will be rotated for keeping the position of wheel 2 in the same general relation to bracket 81. Bracket 81 is bent downward at 84 any desired distance and has passing therethrough a stud 85 that is formed with an enlarged portion 86 through which a bolt 87 is passed for connecting arm 55 with enlarged portion 86.

Bracket 69 is formed with flanges 88 and 89 for partially encircling the end of beam 1, as seen in Figs. 4 and 6. At the end of beam 1 which is engaged by bracket 69 a plurality of apertures 90 are formed through which a suitable securing means as bolt 91 is passed. A suitable aperture or hole 92 is formed in bracket 69 for accommodating bolt 91. The apertures 90 are designed to permit a lateral adjustment of bracket 69 so as to vary the cut of plow 9.

Wheel 3 is provided with a lever 93 similar to lever 72 and also with connected mechanism similar to the mechanism set forth in connection with wheel 2 and therefore will need no extended description. The wheel 3 and lever 93 and surrounding mechanism are positioned at the opposite end of the frame of the plow to wheel 2 and surrounding mechanism and are designed to be operated in a similar manner for raising and lowering a bracket similar to bracket 69, and also that end of the frame. By this construction the ends of the frame may be raised and lowered for raising and lowering disk 9 for varying the depth of the cut or entirely removing the plow from the ground.

Rigidly secured to gear 43 is a tongue 94 that extends from gear 43 over the frame 4 and is designed to rest thereon. Formed on a clamping member 94' are lugs 95—95 to which is pivotally secured a locking member 96. The locking member 96 is designed to rest normally within notches 97 and 98 respectively according to the direction the plow is traveling. The locking bar 96 extends above tongue 94 a short distance and has secured thereto a foot lever 99 which is preferably formed heavy at one end as 100 for normally acting upon lock 96 to force the same into engagement with apertures 97 and 98. When it is desired to move locking member 96 out of engagement with either of the notches 97 and 98 the lever member 99 is pressed at point 101 which will cause the locking member to move or turn upon its securing means in ears 95—95. After locking member 96 has been thus disengaged the tongue 94 may be moved around over wheel 5 until locking member 96 comes opposite the other notch. When the locking bar 96 comes opposite either of the notches 97 or 98 the same will move into the notch by reason of the weighted end 100 of member 99 normally forcing the same in that direction. A bracket or retaining member 102 is secured to tongue 94 in order to prevent the tongue from leaving frame 4 and thus causing locking member 96 to become disengaged accidentally. The use of the guiding or retaining member 102 also prevents any raising of the tongue 94 and consequent twisting of the shaft 42 and surrounding parts, and in addition acts as a lug or brace secured to tongue 94 for communicating power exerted on tongue 94 to the frame of the plow for assisting bracket 16 to communicate power to the frame from tongue 94.

Secured to the outer end of tongue 94 is a hitching member or clevis 103 which is rigidly secured to a lever 104 by any suitable means as bolt 105. Lever 104 is pivotally mounted at 106 to tongue 94 so that when power is applied to member 103 the same will be communicated to the tongue and from thence to the remaining part of the plow. A segmental rack 107 is secured to the tongue 94, which is designed to receive a bolt 108 secured to lever 104. The bolt 108 is provided with a spring and an operating hand lever 109 in the usual manner for causing the same to engage the teeth of rack 107 and to be disengaged therefrom by the operator at will. By this arrangement the draft on the plow may be varied quickly and without any unbolting or adjusting of parts but by simply moving lever 104 to any desired position on rack 107.

Figures 3, 10, 11:
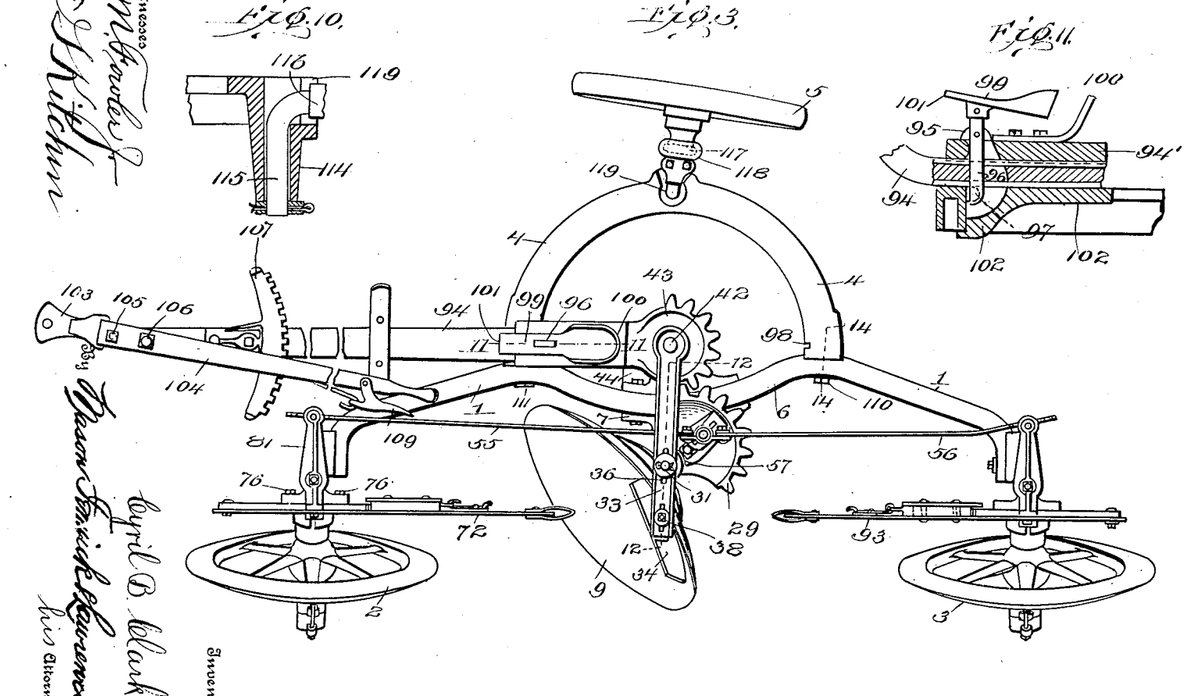
Fig. 3 is a top plan view of the structure shown in Fig. 1.
Fig. 10 is a detail fragmentary sectional view through a depending lug forming a journal bearing for the axle of one of the supporting wheels.
Fig. 11 is a detail fragmentary sectional view approximately on line 11—11 of Fig. 3.

Frame 4 is bolted to frame 1, as clearly seen in Fig. 3, by bolts 110 and 111. The frame 4 is designed to extend over at 112 and 113 for forming in a certain sense gripping members together with bolts 110 and 111 for firmly holding frame 4 in position. Formed at a point on frame 4 mid-way between bolts 110 and 111 is a depending lug 114. The depending portion 114 is designed to form a supporting member for shaft 115 which is bent for forming an axle 116 which in turn carries wheel 5. The hub of wheel 5 has formed thereon a flange 117 which is encircled by a clamping member 118. The clamping member 118 is formed in two parts and bolted together around axle 116 and also flange 117. Immediately above lug 114 is formed a cut-away portion 119 that is designed to give axle 116 a space for swinging and permitting wheel 5 to travel in line parallel with the direction of movement of the plow.

Figure 1:
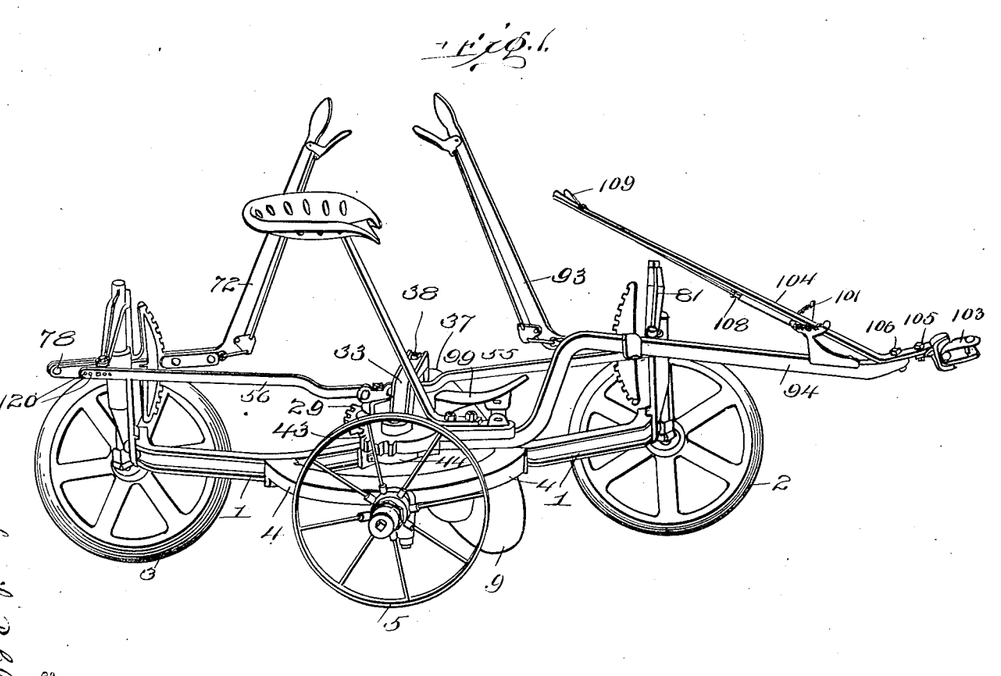
Figure 1 is a perspective view of one embodiment of the present invention.

In use power is applied to clevis 103 and from thence through tongue 94 to the frame composed of members 1 and 4 and from thence to the remaining parts of the plow. As the plow progresses the disk 9 or plow proper passes through the earth and revolves as the same progresses. After the plow has reached the end of the field and it is desired to make a return trip the member 99 is pressed at point 101 and locking member or bar 96 is moved out of notch 97. Locking bar 96 is held disengaged from notch 97 until tongue 94 has been moved slightly upon its pivot 42 toward wheel 5. Tongue 94 is continued in its movement until locking bar 96 falls or moves into engagement with notch 98. During the turning of the tongue segmental gears 43 and 29 mesh and as gear 43 rotates gear 29, and shaft 8 will be rotated, as the same is rigidly connected to gear 29, plow 9 being mounted in a bearing carried by shaft 8 also rotates and takes a proper position corresponding to tongue 94 for cutting a return furrow. During the turning of gear 29 links 55 and 56 are moved or reciprocated which in turn will move brackets 81. The movement of brackets 81 will be communicated to wheels 2 and 3 as heretofore set forth for varying the angle of the same. In changing the width of the cut the angle of the wheels 2 and 3 must be altered. This is accomplished by varying the position of shaft or bolt 49 in the bent over portion 47 of arm 28. A manual adjustment is also provided by means of apertures 120 Fig. 1 provided in the ends of rods 55 and 56 for varying the position of these rods in relation to brackets 81. By the construction of arm 28 and surrounding parts together with links 55 and 56 brackets 81 and connected parts means are provided for automatically turning wheels 2 and 3 at the same time plow 9 is turned and to a proper position. By this means and the means for automatically reversing the plow 9 it is not necessary to turn the frame of the plow or to even move the plow from the ground but to simply turn the same to a reversed position and to pass over the field for a return trip. When it is desired to raise the plow out of the ground entirely or partially as may be desired levers 72 and 93 are operated for raising brackets 69. This will raise member 1 and consequently plow 9 to any desired position.

What I claim is:

1. In a plow, a frame, wheels for supporting said frame, a plow standard, a bracket secured to said frame for supporting said standard, said bracket being formed with elongated apertures for permitting adjustment thereof for varying the position of said plow standard, a reversible beam, and means connecting said reversible beam and said plow standard whereby when said beam is reversed said standard will be reversed.

2. In a plow, a wheel frame, a reversible tongue, a standard adapted to carry a plow, a shaft for acting as the pivot point of said standard, an oscillating member secured to said standard, means secured to said reversible tongue designed to engage said oscillating member whereby when said tongue is reversed said standard will be reversed, a standard for acting as a pivot point for said tongue and an arm pivotally secured to the standard acting as the pivot point of said tongue, said arm being formed with a plurality of elongated apertures near the opposite end thereof, one of said apertures being designed to have a guiding member from said oscillating member project therethrough for varying the position of said arm when said standard is reversed, and the other of said apertures being designed to receive a scraper for said plow, the elongated apertures being designed to permit adjustment of said scraper.

3. In a plow, a wheel frame formed with a member having its central portion arc-shaped, a reversible tongue, a standard adapted to receive a plow, means for connecting said tongue and said standard whereby when said beam is reversed said standard will be reversed, and an adjustable bracket secured to said frame at the arc-shaped portion thereof, the arc-shaped formation of said frame and the adjustability of said bracket permitting an adjustment of the angle of said plow whereby said plow may be adjusted to form the same cut in either direction.

4. In a plow, a wheeled frame, a plow standard, a bracket secured to said frame for supporting said standard, means whereby the said bracket may be adjusted to vary the position of the said standard, a reversible beam, and means connecting said reversible beam and said standard whereby when the said beam is reversed the standard will be reversed.

In testimony whereof I affix my signature in presence of two witnesses.

CYRIL B. CLARK.

Witnesses:
  H. E. HARDIN,
  W. ERRINGTON.